June 14, 1955
C. W. KERSHAW
2,710,454
MULTIPLE JIG TOOL
Filed Jan. 3, 1952
2 Sheets-Sheet 1
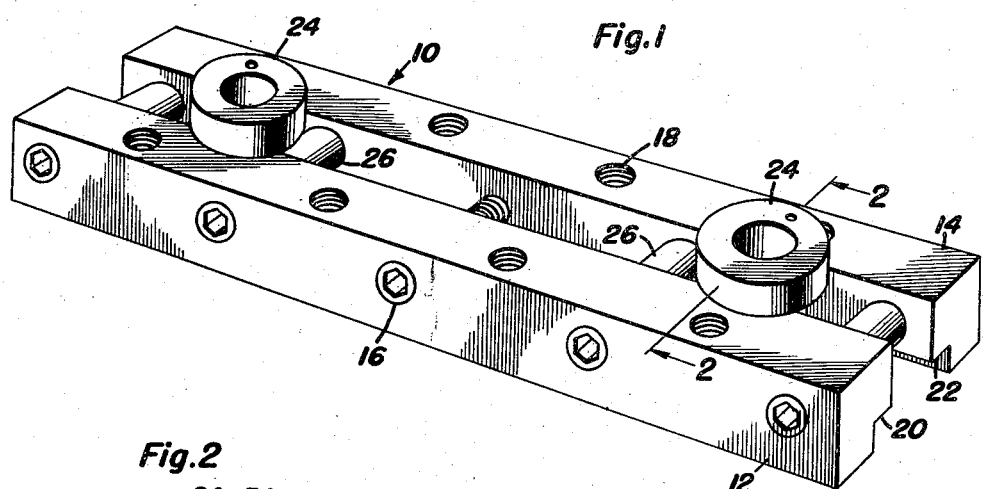
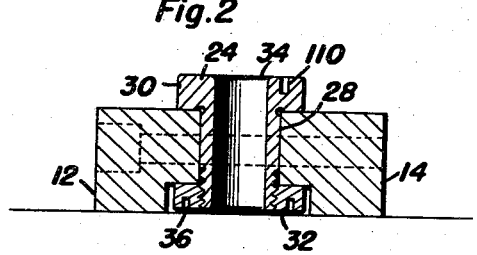
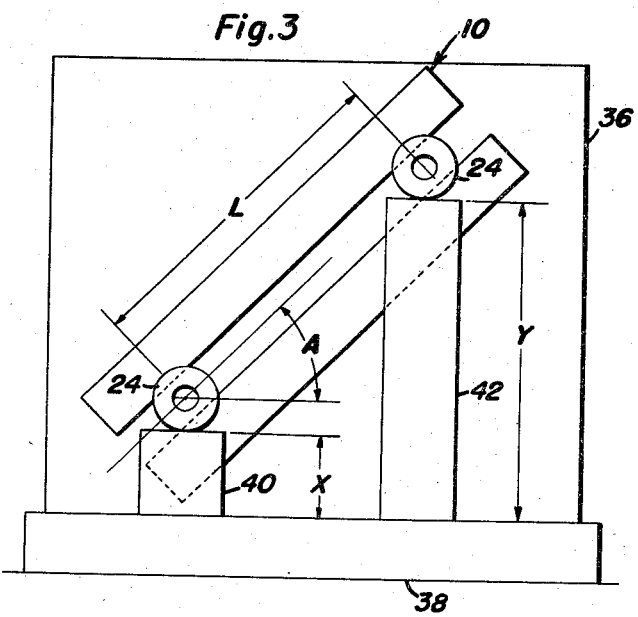
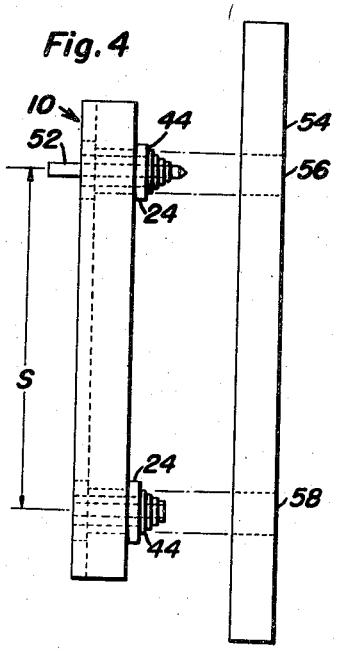
Cornelius W. Kershaw
INVENTOR.
BY
*Clarence A. O'Brien*
*and Harvey B. Jacobson*
Attorneys June 14, 1955
C. W. KERSHAW
2,710,454
MULTIPLE JIG TOOL
Filed Jan. 3, 1952
2 Sheets-Sheet 2
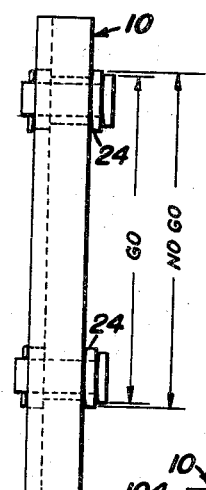
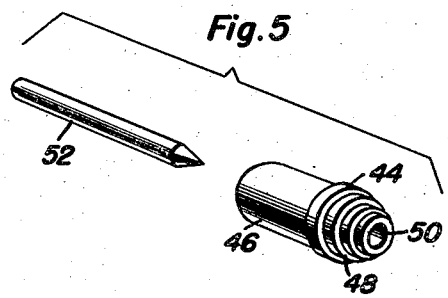
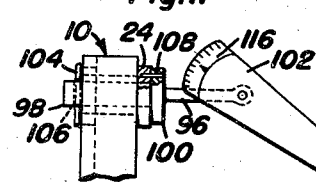
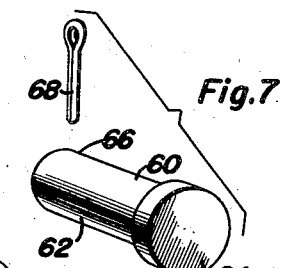
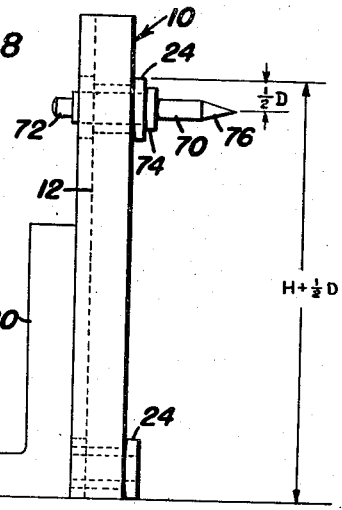
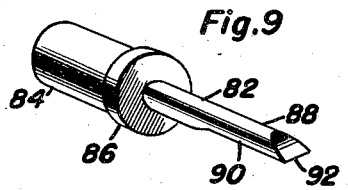
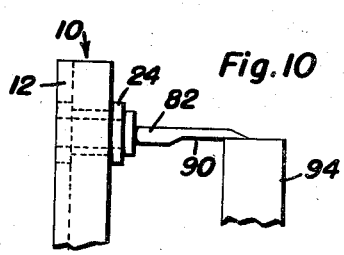
Cornelius W. Kershaw
INVENTOR.
BY

United States Patent Office 2,710,454
Patented June 14, 1955

2,710,454

MULTIPLE JIG TOOL

Cornelius W. Kershaw, Flushing, N. Y., assignor of two-thirds to Doris E. Kershaw, Flushing, N. Y.

Application January 3, 1952, Serial No. 264,741

8 Claims. (Cl. 33—174)

This invention relates generally to a multiple jig tool and more particularly to a multiple jig tool which is especially adapted for measuring.

The primary object of this invention is to provide a multiple jig tool in which there may be easily inserted a plurality of different measuring elements.

Another object of this invention is to provide a multiple jig tool which is simple in construction, strong, durable, light in weight and of compact construction which may be manufactured economically.

Another object of this invention is to provide a multiple jig tool to which a plurality of different measuring elements may be quickly attached.

A further object of this invention is to provide a multiple jig tool which, while it is of simple construction, is extremely accurate, and may be easily adjusted.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view of the basic jig tool without the measuring and marking members attached thereto;

Figure 2 is a transverse vertical sectional view taken substantially in the plane indicated by the section line 2—2 of Figure 1 and showing the construction of the adapter member;

Figure 3 is a front elevational view of the multiple jig tool, which is the subject of this invention, used in combination with gauge blocks to mark certain lines at a predetermined angle;

Figure 4 is an exploded side elevational view of the multiple jig tool provided with a plurality of measuring members for determining the distance between centers of holes;

Figure 5 is an exploded perspective view of the measuring member shown in Figure 4;

Figure 6 is a side elevational view of the multiple jig tool having mounted thereon measuring members to form a go-no-go gauge;

Figure 7 is an exploded perspective view of the measuring member shown in Figure 6;

Figure 8 is a side elevational view of the multiple jig tool having mounted thereon a measuring member for scribing on a plate a line which is a predetermined distance from the edge of the plate;

Figure 9 is a perspective of another measuring member forming part of the invention;

Figure 10 is a partial front elevational view of the multiple jig tool utilizing the measuring member of Figure 9; and Figure 11 is a partial front elevational view of the multiple jig tool having mounted thereon an indicating gauge.

Referring now more specifically to the accompanying drawings, wherein like numerals designate similar parts throughout the various views, it will be seen that the embodiment of the invention depicted in the drawings as illustrative of the principles of the invention, comprises a novel multiple jig tool in which there are removably mounted a plurality of measuring members. Referring more specifically to Figure 1, the invention includes a jig tool 10 which is formed of a pair of spaced parallel identical bars 12 and 14 which are secured together by a plurality of Allen set screws 16 which are rotatably received in one bar and threadably received in the other bar. Formed in the top surface of the bars 12 and 14 are a plurality of threaded bores 18 by which various elements may be bolted to the bars. The lower inner corners of the bars 12 and 14 are removed to form shoulders 20 and 22, respectively, which are spaced outwardly from the bottom of the bars 12 and 14. Clamped between the bars 12 and 14 in adjustable relation thereto, are a plurality of adapter members 24. While Figure 1 only shows two adapter members 24, it is readily understood that more-or-less may be used at the same time. Each of the Allen set screws 16 may be provided with a sleeve 26 engaging opposed sides of the bars 12 and 14 to prevent warping of the bars when the set screws 16 are tightened down to clamp the adapter members 24 between the bars 12 and 14.

Referring now to Figure 2, it will be seen that the adapter member 24 has a cylindrical body portion 28 and enlarged upper and lower flanges 30 and 32, respectively. The adapter member 24 has a central bore 34, the purpose of which will be discussed hereinafter. The annular flange 32 is separate from the other portions of the adapter member 24 and is threadedly secured to the body portion 28. The lower flange 32 is provided with a plurality of bores 36 in which are receivable prongs of a spanner wrench (not shown) whereby the lower flange 32 may be tightly threaded onto the body portion 28 with the flanges 30 and 32 tightly clamping portions of the bars 12 and 14 therebetween. It is readily apparent that since the bars 12 and 14 tightly clamp the body portion 28 and the flanges 30 and 32 tightly clamp the bars 12 and 14, the adapter member 24 is maintained in fixed relation to the bars.

Referring now to Figure 3, the jig tool 10 is illustrated as being utilized to mark the center line of holes to be bored in a plate 36 at an angle to the edges thereof. In order to perform this operation, the center lines of the adapter members 24 are spaced apart a distance L which is equal to the spacing of the proposed holes. The plate 36 is then mounted in a vertical position on a support 38. Mounted on the support 38 in spaced relation are a first gauge block 40 having a height X and a second gauge block 42 having a height Y. It is readily apparent that through the use of ordinary trigonometry that the heights X and Y can be figured whereby the angle A between the horizontal the plane passing through the axes of the adapter members 24 is the desired angle. The distance L between the centers of the adapter members 24 may be of a fixed length such as 5 inches or 10 inches, whereby the heights X and Y may be more easily figured. When the distance L is a constant length, the points of a desired line are found and then the centers of the holes are marked on the line in their desired spacing.

The multiple jig tool 10 is shown in Figure 4 as being provided with a plurality of plug elements 44 for determining the spacing of the center lines of holes already formed in a member or plate. The plug element 44, as shown in Figure 5, has a shank 46 and an enlarged flanged head 48 which is provided with a plurality of annular shoulders of increasing diameter toward the shank 46. The plug 44 is provided with a central bore 50 in which is slidably received a punch 52. The plug 44 is attached to the jig tool 10 by inserting the shank 46 into the aforementioned bore 34 of its associated adapter member 24. The jig tool 10 when provided with the plug elements 44 is especially designed for measuring the distance between center lines of existing holes, and then duplicating said spacing on other members. For example, Figure 4 shows a plate 54 provided with a pair of spaced holes 56 and 58 of unknown spacing. The set screws 16 of the jig tool 10 are loosened whereby the adapter members 24 may be slid between the bars 12 and 14, and then the plug elements 44 are inserted into the holes 56 and 58. One of the shoulders of the head 48 engages snugly in each of the holes 56 and 58. With the plug elements 44 aligned in the holes 56 and 58, the set screws 16 are then tightened and the plug elements 44 and the adapter members 24 are now spaced a distance S which is equal to the spacing of the holes 56 and 58. Punches 52 are then inserted in the bores 50 of the plug elements 44 and the jig tool 10 is then moved to a position overlying the member in which it is desired to drill additional holes having the spacing S. With the jig tool 10 in the overlying position, the punches 52 are then struck whereby center marks are formed on the object to be drilled at the correct spacing.

Figures 6 and 7 show a different modified form of plug element 60 having a shank 62 and an enlarged flanged head 64. The shank 62 is provided with a transverse bore 66 in which is adapted to be received a cotter key 68. A pair of the plug elements 60 are mounted in the jig tool 10 with their shanks 62 received in the bores 34 of spaced adapter members 24. The shanks 62 are retained in the bores 34 by the cotter key 68, which are passed through the bore 66 after the plug elements 60 are in place. The enlarged flange 64 of the plug element 60 is of a slightly less diameter than the diameter of the upper flange 30 of the adapter members 24. It is believed to be readily apparent that the jig tool 10 when provided with the plug element 60 may be used as a go-no-go gauge. For example, if it is desired to provide a member with an opening of a length equal to 4.000 inches and no greater than 4.005 inches, the adapter members 24 are secured in the jig tool 10 with the extreme portions of the upper flanges 30 a distance apart equal to 4.005 inches. The enlarged flanges 64 of the plug members 60 are then machined to have a diameter of 0.0025 inch less than the diameter of the upper flanges 30, whereby the distance between the extreme edges of the flanges 64 will be equal to 4.000 inches. The tool is then used in the same manner as a conventional go-no-go gauge.

Referring now to Figure 8, when it is desired to inscribe a mark of a predetermined height on a member, the jig tool 10 is provided with a plug element having a sharp point thereon in the form of either a prick punch or a scriber. This modification of plug element is referred to by the reference numeral 70 and includes a shank 72 which is received in the bore 34 of an adapter member 24. At one end of the shank 72 is an enlarged annular flange 74 to which is integrally attached a pointed extension member 76. Mounted on the underside of the jig tool 10 is a right-angled angle member having a horizontal flange 78 and a vertical flange 80. The vertical flange 80 is secured to the jig tool 10 with the outer edge of the flange 78 in alignment with the ends of the bars 12 and 14. An adapter member 24 is secured in the jig tool 10 with a portion of its upper flange 34 tangential to the plane of the ends of the bars 12 and 14. The adapter member 24 which is provided with the plug element 70 is clamped between the bars 12 and 14 with the extreme portion of its upper flange 30 spaced from the plane of the ends of the bars 12 and 14 a distance equal to the desired height H plus a distance equal to one-half the diameter D of the annular flange 40.

In view of the foregoing, it is readily seen that when the jig tool 10 is mounted in a vertical position on a support common to the member to be marked, the pointed end 76 of the plug element 70 is in a position to inscribe marks at the desired height H.

Figures 9 and 10 show another modification of a plug element, which when used in the jig tool 10 is adapted to measure the height of a member. The modified plug element 82 has a shank 84, an enlarged annular flange 86, and an extension 88 integral with the flange 86. The extension 88 is provided with a flat portion which coincides with the axis of the shank 84 and a chisel end 92. The plug element 82 is used to mark lines of a desired height in a manner similar to a plug element 70. However, the correct height of the chisel point 92 is found by mounting a gauge block 94 of the desired height on a common support with the jig tool 10, and then adjusting the adapter member 24 mounted adjacent the upper end of the bars 12 and 14 until the flat underside 90 of the plug element 82 is flush with the upper end of the gauge block 94. The guage block 94 is then removed and the object to be marked is placed on the common support and marked with the chisel end 92 of the plug element 82.

When it is merely desired to measure the height of an object, the plug element 70 in the jig tool modification as shown in Figure 8 is replaced by another modified plug element 96. The modified plug element 96 has a shank 98, and an enlarged flange 100 on one end of the shank 98 and an indicator gauge integral with and extending from the enlarged flange 100. The indicator gauge is referred to generally by the reference numeral 102. The shank 98 of the modified plug element 96 is disposed in a bore 34 of an adapter member 24 and is retained therein by a cotter pin 104 which is secured in a bore 106 through the shank 98. The plug element 96 is rendered non-rotatable by a pin 108 carried by the flange 100 and disposed in a bore 110 in the opposite side of the upper flange 30 of the adapter member 24. In operation the jig tool 10 provided with the modified plug element 96 is mounted on a support common to a member whose height is desired to be measured with the ball end 112 of the indicator gauge 102 engaging the upper surface of the member. The adapter 24 is then locked in position and the member removed. The gauge blocks 114 are then stacked on the common support with their upper surfaces engaging the ball point 112 until the indicator needle 116 of the indicator gauge 102 is once again at the zero position. The total height of the gauge blocks 114 is then determined and this is the height of the member which was measured.

While the plug element 96 is the only plug element shown having a pin for mounting the plug element in non-rotatable relation to adapter members 24, it is obvious that the other plug elements may also be provided with such a pin.

The bars 12 and 14 are made with a fine degree of accuracy of tool steel which has been hardened, ground and lapped. The adapter members 24 and all of the parts of the various plug elements are also machined with close tolerances of hardened tool steel. Due to the fine machining and the forming of the elements of hardened tool steel, the multiple jig tool which is the subject of this invention is a precision tool.

It will be understood that since the bars 12 and 14 are adjustably secured together by screws 16, that the bars can accommodate a wide range of sizes of adapter members 24. The jig tool may be utilized as an adjustable drill fixture to drill and ream holes at accurate center distances by the use of slip bushings (not shown) positioned in the adapter members 24. Since the adapter members may be of any size, they may be made to receive slip bushings to fit any size of drill and reamer.

Another advantage of the multiple jig tool is that the adapter members 24 have circular cross sections and therefore permit the user of the tool to measure over them and determine the center distance therebetween without requiring the use of plugs.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly suitable modifications and equivalents may be resorted to, falling within the scope of the appended claims.

Having described the invention, what is claimed as new is:

1. A multiple jig tool comprising a pair of spaced parallel bars, a plurality of spaced adjustable fasteners extending between said bars and tying same together, a plurality of adapter members clamped between said bars, said bars having their lower inner corners omitted to form a pair of shoulders, said adapter members having body portions disposed between said bars, and enlarged upper and lower end portions in the form of annular flanges, the upper flange engaging the upper surfaces of said bars, the lower flange engaging said shoulders, said adapter members being circular in cross-section and having bores therethrough, the axes of said bores being normal to the plane of said bars, plug elements removably secured in said bores.

2. The tool of claim 1, wherein said elongated shanks are hollow and have punches slidable therein.

3. The tool of claim 1, wherein the plug elements are provided with extensions integral with said annular flanges, said extensions having flat surfaces normal to the longitudinal axis of said bars and in alignment with the axis of the adapter members.

4. The tool of claim 1, wherein the plug elements carry indicator gauges.

5. The multiple jig tool of claim 1 wherein said plug elements include elongated shanks and flanges on said shanks, said shanks being disposed in said bores and said flanges of the plug elements overlying and engaging upper flanges of said adapter members, said flanges of the plug elements being of a slightly less diameter than said upper flanges to form a go-no-go gauge.

6. The multiple jig tool of claim 1 wherein said plug elements include elongated shanks and flanged heads on said shanks, said shanks being disposed in said bores, said flanged heads including a plurality of annular shoulders of decreasing diameters.

7. The multiple jig tool of claim 1 wherein said plug elements include elongated shanks and flanged heads on said shanks, said shanks being disposed in said bores, said flanged heads including a plurality of annular shoulders of decreasing diameters, said shanks having bores therethrough, center punches positioned in said bores of the shanks.

8. The multiple jig tool of claim 1 wherein said plug elements include pins, apertures in said adapter members receiving said pins to prevent rotation of said plug elements.

References Cited in the file of this patent

UNITED STATES PATENTS

| | | |
|---|---|---|
| 642,750 | Nielsen | Feb. 6, 1900 |
| 1,433,820 | Huesman | Oct. 31, 1922 |
| 1,580,426 | Farnam | Apr. 13, 1926 |
| 1,666,934 | Haywood | Apr. 24, 1928 |
| 2,489,733 | Ullman | Nov. 29, 1949 |
| 2,621,807 | Rendich | Dec. 16, 1952 |

FOREIGN PATENTS

| | | |
|---|---|---|
| 575,360 | Great Britain | Feb. 14, 1946 |